(12) United States Patent
Beers

(10) Patent No.: US 6,585,192 B2
(45) Date of Patent: Jul. 1, 2003

(54) VENTED COMPARTMENT INERTING SYSTEM

(75) Inventor: Karl S. Beers, Upper Darby, PA (US)

(73) Assignee: L'Air Liquide - Societe Anonyme A'Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 289 days.

(21) Appl. No.: 09/746,087

(22) Filed: Dec. 21, 2000

(65) Prior Publication Data
US 2002/0117052 A1 Aug. 29, 2002

(51) Int. Cl.$^7$ .............................................. B64D 45/00
(52) U.S. Cl. ..................... 244/135 R; 95/54; 95/96; 95/138; 96/4; 96/128; 55/385.4
(58) Field of Search ..................... 244/129.2, 135 R, 244/135 C, 136, 135 A, 135 B; 95/54, 96, 138; 96/4, 128; 55/385.4

(56) References Cited

U.S. PATENT DOCUMENTS

| | | | | |
|---|---|---|---|---|
| 4,556,180 A | * | 12/1985 | Manatt | 244/135 R |
| 4,883,410 A | * | 11/1989 | Goddard et al. | 417/69 |
| 5,755,854 A | * | 5/1998 | Nanaji | 95/11 |
| 5,843,212 A | * | 12/1998 | Nanaji | 96/4 |
| 2002/0028168 A1 | * | 3/2002 | Giacobbe et al. | 423/212 |

* cited by examiner

Primary Examiner—Charles T. Jordan
Assistant Examiner—Stephen Holzen
(74) Attorney, Agent, or Firm—Linda K. Russell

(57) ABSTRACT

1. An inerting system for a vented controlled atmosphere container, for inerting a flammable gas comprising a flammable vapor and oxygen, comprising:

(i) a container;
   (ii) an outlet in the container for the flammable gas;
   (iii) a compressor, in fluid communication with the outlet, which compresses the flammable gas from the container;
   (iv) a separator, in fluid communication with the compressor, for removing oxygen from the flammable gas to produce an oxygen-depleted flammable gas;
   (v) an inlet in the container, which is in fluid communication with the separator; through which the oxygen-depleted flammable gas is fed into the container.

21 Claims, 3 Drawing Sheets

VENTED COMPARTMENT INERTING SYSTEM

BACKGROUND OF THE INVENTION

1. Field of the Invention

The present invention relates to a vented compartment inerting device for quickly and selectively rendering a vented compartment nonexplosive and, more particularly, to a method and apparatus for rapid and efficient inerting of a vented compartment.

2. Description of the Related Art

According to the Federal Aviation Administration, at least ten airplane loss events between 1959 and 1998 have involved fuel tank explosions. There is a thus a need in the aviation industry for eliminating, or reducing the risk due to explosive fuel-air mixtures in fuel tanks of airplanes. The U.S. Federal Aviation Administration has studied various potential solutions for reducing the risk of fuel tank explosions, including reducing the heat input to tanks by ventilation or relocation of the tanks, altering fuel properties such as raising the flash point, and fuel inerting. However, relocation of the fuel tanks is only feasible on new airplanes; full-time ventilation of the fuel tanks is estimated to cost over 3.5 billion dollars over ten years, and alteration of the fuel flash point is estimated to cost over 75 billion dollars worldwide over ten years. Only fuel tank inerting seems to be a viable short term option.

Fuel tank inerting can be effected either on each airplane or on the ground prior to and following flights. In-plane inerting would have the advantage of being tailorable for each plane. Ground inerting would have the advantage of being less expensive to maintain, as it could be a single system at selected airports, rather than a system in each plane. Ground inerting also provides the advantage of not requiring the additional weight on the plane attributable to the presence of an inerting apparatus on the plane. Both methods may be employed together as an extra level of safety that will minimize the amount of time that an explosive mixture exists in the fuel tanks.

Inerting of fuel tanks involves rendering the fuel vapors and other gases (known as ullage) that exist over a supply of fuel less explosive. This generally involves removing the oxygen from the ullage and/or replacing it with an inert gas. Nitrogen is a preferred inert gas because it is relatively plentiful and inexpensive.

Various methods exist for separating mixtures of gases for the production or purification of nitrogen and oxygen. Current methods include both selectively permeable membranes and pressure swing absorption. Selectively permeable membranes work by passing a mixture of gases over a membrane that has a relatively high permeability to one of the gases, and a relatively low permeability to the other gas. For example, a membrane that is more permeable to oxygen than to nitrogen may be used to separate oxygen from an air stream by flowing air through such a membrane. The oxygen will pass through and may be recaptured on the other side of the membrane, while the nitrogen will not pass through. Pressure swing absorption systems use selectively absorbent beds into which a mixture of gases is introduced under high pressure. U.S. Pat. No. 4,194,891 describes such a bed for the separation of oxygen from air. An alternating exposure of high and low pressures causes the beds to release oxygen at a relatively faster rate than the beds release nitrogen.

It is known to try to use inert gases to displace oxygen over supplies of flammable liquids where it is desired to avoid the formation of explosive gases. U.S. Pat. No. 5,858,064 discusses producing nitrogen produced by a gas separation system and a method for introducing nitrogen into and through a crankcase for inerting the interior of the crankcase. But merely blowing an inert gas into a vented fuel compartment is not a desirable or effective solution. A problem that exists is that introduction of a volume of nitrogen into a vented fuel tank will necessarily cause venting of an equivalent volume of ullage from the compartment. This exhaust includes a potentially flammable mixture of oxygen and fuel vapors. Even if this mixture is captured and safely handled, the removal of the displaced fuel vapors can add up to a large loss of valuable fuel and have a significant impact on the environment by the needless dumping of the hydrocarbon fuel into the atmosphere.

A need therefore exists for a relatively inexpensive method and apparatus for inerting the ullage in a fuel tank without losing fuel or fuel vapors while minimizing the risk of fire or explosion and without making the cost prohibitive in terms of equipment or the need for added weight on an aircraft.

SUMMARY OF THE INVENTION

The present invention fulfills the above need and fills the voids in the prior art by providing a system for inerting a vented compartment that comprises a system for separating the oxygen from the mixture of air and flammable vapor present in tank ullage and returning the oxygen depleted hydrocarbon/nitrogen mixture to the compartment.

In a first aspect, the present invention relates to a vented controlled atmosphere container inerting system, for inerting a gas comprising a flammable vapor and oxygen, comprising:

(i) a container;

(ii) an outlet in said container for said flammable gas;

(iii) a compressor, in fluid communication with said outlet, which compresses the flammable gas from the container;

(iv) a separator, in fluid communication with said compressor, for removing oxygen from said flammable gas to produce an oxygen-depleted flammable gas;

(v) an inlet in said container, which is in fluid communication with said separator, through which said oxygen-depleted flammable gas is fed into said container.

In a preferred embodiment of this first aspect, the system further includes a supply of make up gas to replace the volume of oxygen removed from the vented container. Preferably, the make up gas is provided by using a second separator for removing the oxygen from a supply of make up gas to replace the volume of oxygen removed from the vented compartment. The system is typically employed with the ullage associated with a fuel tank.

In a second aspect, the present invention relates to a method of inerting a flammable gas, comprising a flammable vapor and oxygen, in a vented controlled atmosphere container comprising the steps of:

(i) removing said flammable gas from said container;

(ii) compressing said gas;

(iii) removing the oxygen from said flammable gas to produce an oxygen-depleted gas;

(iv) feeding said oxygen-depleted gas into said container.

In a preferred embodiment of the second aspect, the method further comprises the step of providing an amount of make up gas to the container to replace the volume of oxygen depleted from the flammable gas. Typically, the flammable gas removed from the container is the fuel ullage associated with a fuel tank.

A preferred embodiment of the second aspect of the invention relates to a method of inerting flammable gas, further comprising the step of feeding a make-up gas into the container to replace the volume of oxygen removed from the flammable gas in the separating step. This is preferably achieved by providing a second separating step wherein oxygen is removed from air and the oxygen-depleted air fed to the container.

DETAILED DESCRIPTION OF PREFERRED EMBODIMENTS

Figure 1:
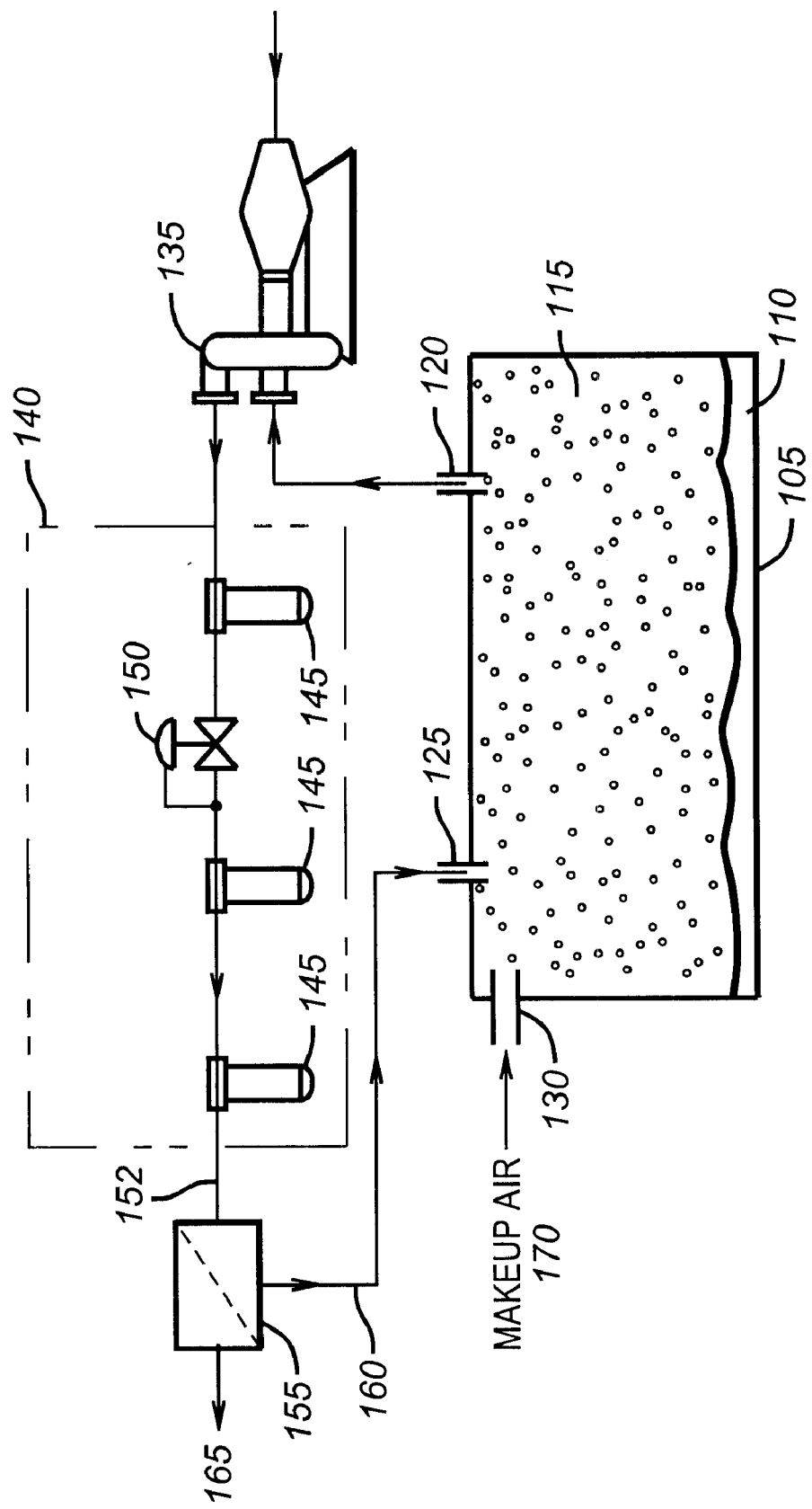
FIG. 1 is a schematic diagram of a first embodiment of a vented compartment inerting system of the present invention.

FIG. 1 is a schematic diagram of a first embodiment of a vented compartment inerting system of the present invention. Table 1 shows the relative flow rates, pressures, and temperatures of flows of gas in this embodiment.

The vented fuel tank 105 contains a supply of a liquid hydrocarbon (HC) 110, and the ullage 115 above the HC 110 is a gaseous mixture of HC, oxygen ($O_2$), and nitrogen ($N_2$). The tank 105 has an outlet 120, an intake 125, and a vent 130. In a first embodiment of the present invention, tank ullage 115 is taken from the tank 105 and fed through a conduit to a compressor 135. The compressor 135 can be of any type, however, a turbine driven compressor would be preferred where energy from a turbine is available, for instance, near a jet engine on an airplane. The compressor 135 compresses the ullage, and the compressed HC, $O_2$ and $N_2$ is then routed to an air conditioning stage 140 where it is passed through one or more collessing filters 145 and a pressure regulator 150 to lower the pressure to prepare the compressed ullage for a separator, and optionally a heat exchanger.

The separator 155 can be any type known in the art that is suitable for handling a mixture of hydrocarbons and air, including selectively permeable membrane separators, pressure swing absorption separators, or any other separator that can selectively remove oxygen from a mixture of air and hydrocarbons, leaving oxygen enriched air (OEA) and hydrocarbons in nitrogen enriched air (NEA).

The conditioned stream 152 exits the air conditioning stage 140 and enters the separator 155, where it is divided into a NEA stream 160 that is mostly HC and $N_2$ with traces of $O_2$, and a OEA permeate stream 165 of $O_2$ with traces of HC and $N_2$. The OEA permeate can be exhausted; the trace levels of HC in the permeate flow can be recaptured or exhausted. The NEA stream 160 exits the separator 155 and is routed back to the tank 105.

TABLE 1

Relative Flow Rates, Pressures, and Temperatures of Gas Flows in a First Embodiment of The Present Invention

| Direction of flow | Flow Rate | Pressure | Temperature |
| --- | --- | --- | --- |
| From tank to compressor | $F_1$ | $P_{amb}$ | $T_{amb}$ |
| From compressor to regulator | $F_1$ | $P_{comp}$ | — |
| From regulator to separator | $F_1$ | $P_1$ | $T_1$ |
| NEA from separator to tank | $F_2$ | $P_2$ | — |
| OEA from separator | $F_3$ | $P_{amb}$ | — |
| Tank vent flow | $F_4$ | $P_{amb}$ | $T_{amb}$ |
| Turbine drive flow | $F_5$ | $P_3$ | $T_2$ |

Because the vented tank 105 has a fixed volume, and because a volume of gas has been removed from the tank 105 equivalent to the flow $F_3$ of OEA stream 165 from the separator 155, make up gas must be supplied to the tank 105 in order to maintain ambient pressure. This make up gas can be in the form of make up air 170 admitted to the tank 105 through the tank vent 130.

Figure 2:
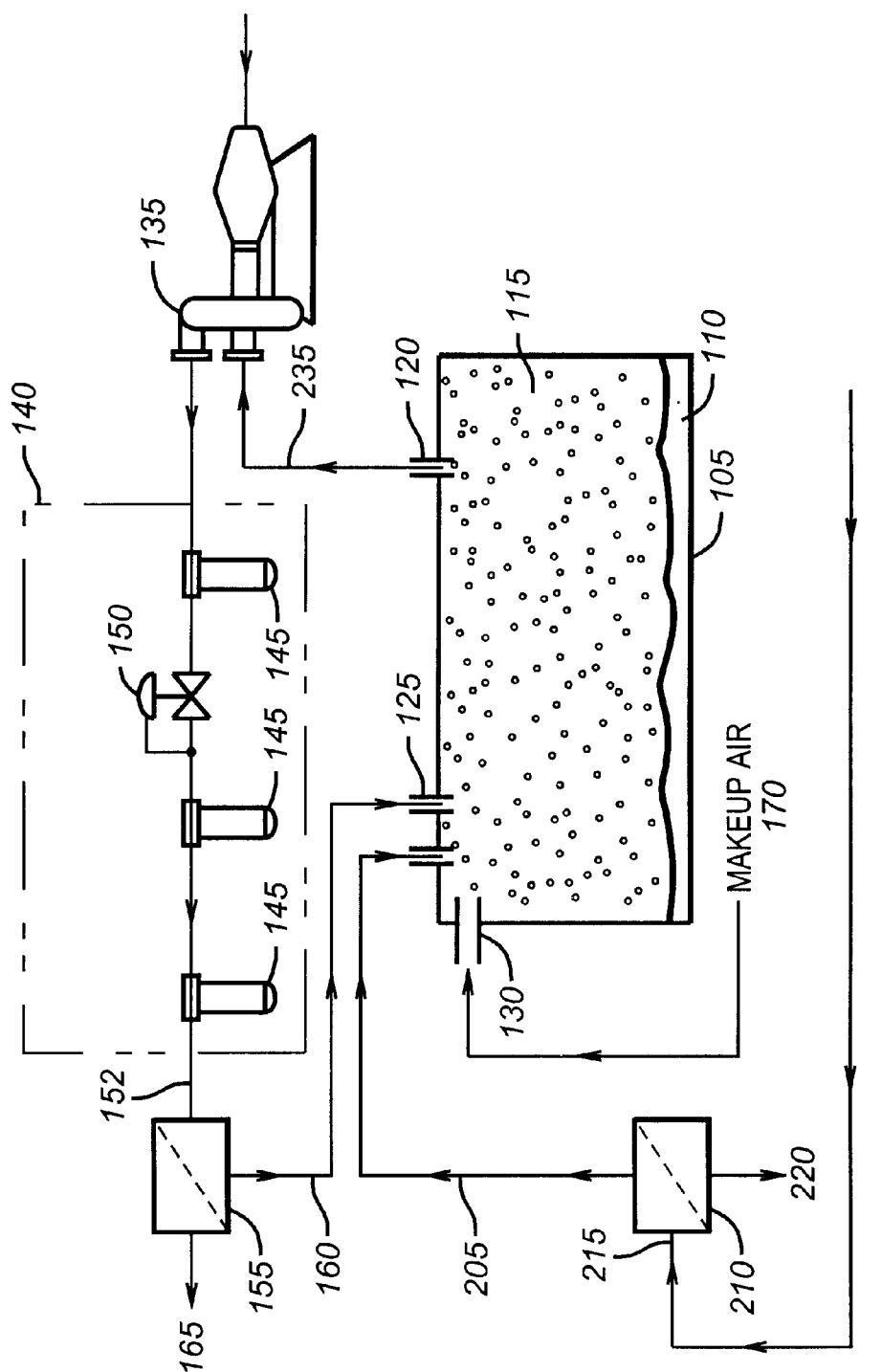
FIG. 2 is a schematic diagram of a second embodiment of a vented compartment inerting system of the present invention, utilizing a modified make up air supply.
Figure 3:
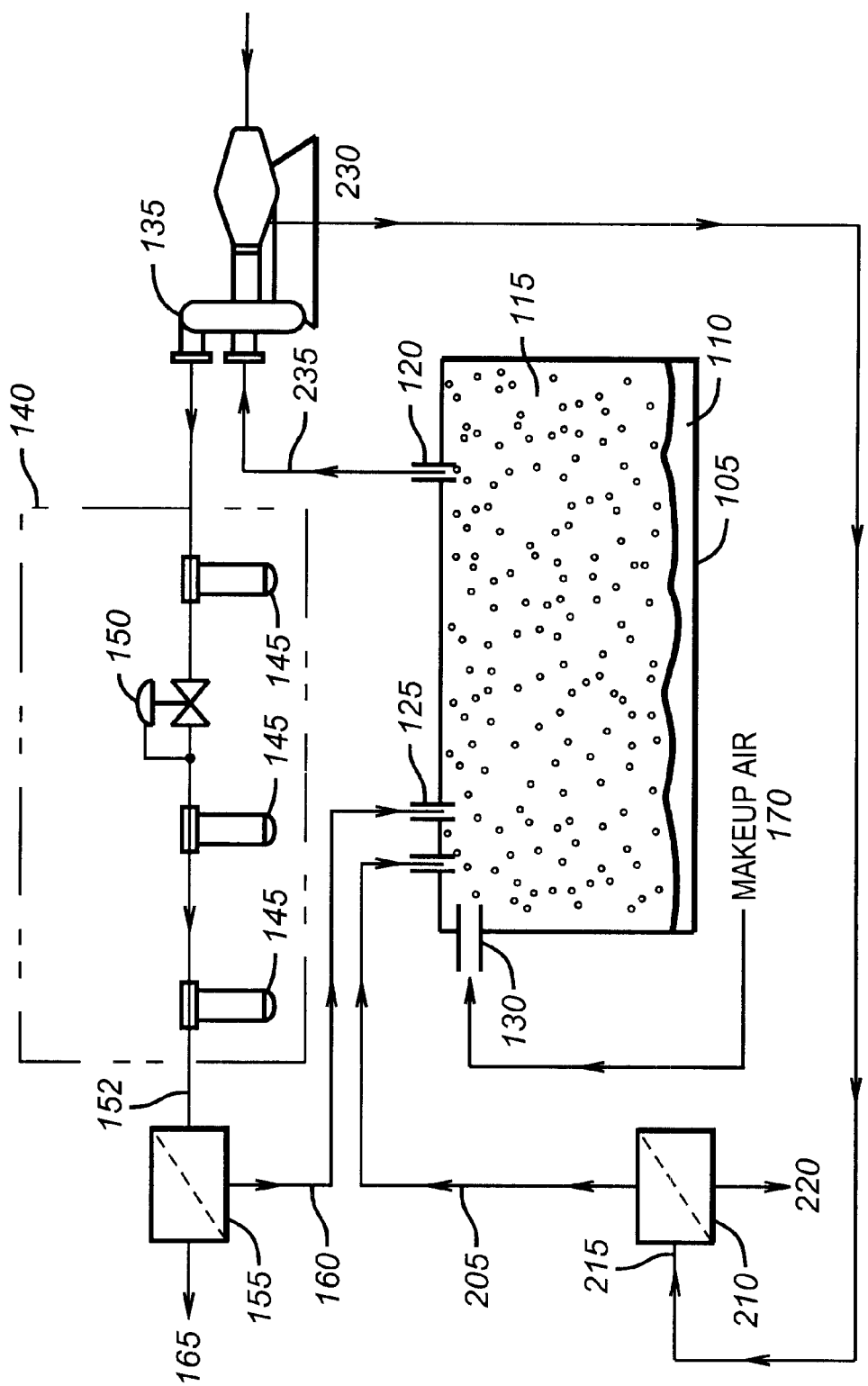
FIG. 3 is an energy saving modification illustrating another embodiment.

The percentage of oxygen in the ullage 115 should preferably be less than 15%, preferably less than 12%, and most preferably less than 9% to significantly reduce the risk of fire or explosion. Because the $O_2$ in the make up air 170 is approximately 20.9% if ambient air is used, significantly decreased time to inert the tank 105 can be achieved by lowering the level of $O_2$ in the make up gas prior to introducing the make up gas into the tank 105. This is the basis of a second embodiment of the present invention. FIG. 2 shows a schematic of this second embodiment, which includes a modification that precludes the need for a second compressor. In this second embodiment, a significant percentage of make up gas 205 that is routed to the tank 105 to replace the separated OEA stream 165 from the first separator comes from an NEA stream 205 taken from a second separator 210.

As in the first embodiment, ullage 115 from the tank 105 is routed to a turbine driven compressor 135, which compresses the ullage and passes it to conditioning equipment 140, including filters 145 and a pressure regulator 150, and optionally a heat exchanger. The conditioned stream 152 from the conditioning equipment 140 is fed to a first separator 155, from which the OEA stream 165 is exhausted and the NEA stream 160 is fed to the tank 105.

However, in this embodiment, a make up NEA stream 205 for the tank 105 that replaces the volume of OEA 165 from the first separator 155 comes from a second separator 210. Compressed air 215 is fed to this second separator 210, which separates the air into a second OEA stream 220 and a make up NEA stream 205. The OEA stream 220 is exhausted, while the make up NEA stream 205 is fed to the tank 105 in sufficient flow rate to replace the volume of gas lost to the OEA stream 165 from the first separator 155. In this way, the net volumetric flow from the tank 105 is zero, which precludes the need for any ambient make up air 170. Table 2 shows the relative flow rates, pressures, and temperatures of gas flows in this second embodiment.

Advantageously, because the $O_2$ level in the make up NEA gas 205 is near zero, the inerting of the tank 105 can be accomplished in a significantly reduced time over an apparatus that uses only ambient make up air 170.

It should be noted that it is not necessary to employ a second separators for the production of nitrogen enriched/oxygen depleted make up air. It would work as well to simply add a sufficient supply of make up air to the ullage stream 235 from the tank 105 prior to its entering the compressor 135. In this way, the NEA flow 160 from the single separator 165 will be sufficient to maintain a zero net flow into the tank 105 without the need for adding ambient make up air 170 through the vent 130.

TABLE 2

Relative Flow Rates, Pressures, and Temperatures of Gas Flows in a Second Embodiment of the Present Invention

| Direction of flow | Flow Rate | Pressure | Temperature |
|---|---|---|---|
| From tank to compressor | $F_1$ | $P_{amb}$ | $T_{amb}$ |
| From compressor to regulator | $F_1$ | $P_{comp}$ | — |
| From regulator to separator | $F_1$ | $P_1$ | $T_1$ |
| NEA from first separator to tank | $F_2$ | $P_2$ | — |
| OEA from first separator | $F_3$ | $P_{amb}$ | — |
| Intake for second separator | $F_6$ | $P_3$ | $T_3$ |
| NEA from second separator to tank | $F_3$ | $P_4$ | — |
| OEA from second separator | $F_7$ | $P_{amb}$ | — |
| Tank vent flow | $F_4$ | $P_{amb}$ | $T_{amb}$ |
| Turbine drive flow | $F_5$ | $P_3$ | $T_2$ |

As an energy saving modification of this second embodiment, the compressed air flow 215 to the second separator 210 is taken as a bleed 230 from the turbine drive flow for the compressor 135. The excess air from the turbine 135 is already under pressure as it leaves the turbine 135, and does not need to be compressed prior to entry into the second separator 210. This modification is enabled by the presence of a turbine 135, such as would be found on a jet powered airplane.

Although only preferred embodiments have been specifically described above, it will be appreciated that it is possible to make modifications and variations of the preferred embodiment without departing from the spirit and intended scope of the invention.

What is claimed is:

1. An inerting system for a vented controlled atmosphere container, for inerting a flammable gas comprising a flammable vapor and oxygen, comprising:
   (i) a container;
   (ii) an outlet in said container for said flammable gas;
   (iii a compressor, in fluid communication with said outlet, which compresses the flammable gas from the container;
   (iv) a separator, in fluid communication with said compressor, for removing oxygen from said flammable gas to produce an oxygen-depleted flammable gas;
   (v) an inlet in said container, which is in fluid communication with said separator, through which said oxygen-depleted flammable gas is fed into said container.

2. The system of claim 1, further comprising a supply of makeup gas to replace any lost volume in said container.

3. The system of claim 1, wherein said makeup gas is oxygen-depleted air.

4. The system of claim 2, further comprising a second separator for removing oxygen from air to obtain said make-up gas of oxygen-depleted air.

5. The system of claim 4, further comprising a source of compressed air for feeding air to said second separator.

6. The system of claim 3, wherein said second separator is a membrane separator.

7. The system of claim 1, wherein said vented container is a fuel tank.

8. The system of claim 7, wherein said flammable gas is fuel tank ullage.

9. The system of claim 1, wherein said separator is a membrane separator.

10. The system of claim 1, wherein said separator is a pressure swing absorption separator.

11. A method of inerting a flammable gas, comprising a flammable vapor and oxygen, in a vented controlled atmosphere container comprising the steps of:
   (i) removing said flammable gas from said container;
   (ii) compressing said gas;
   (iii) removing an amount of oxygen from said flammable gas to produce an oxygen-depleted gas;
   (iv) feeding said oxygen-depleted gas into said container.

12. The method of claim 11, further comprising the step of feeding an amount of oxygen-depleted makeup gas to the container.

13. The method of claim 12, wherein the amount of oxygen-depleted makeup gas fed into the container substantially corresponds to the amount, by volume, of oxygen depleted from said flammable gas.

14. The method of claim 12, wherein said step of feeding an amount of oxgyen-depleted makeup gas to the container comprises the steps of removing an amount of oxygen from air to obtain an oxygen-depleted air and feeding the oxygen-depleted air to said container.

15. The method of claim 14, comprising removing oxygen from compressed air.

16. The method of claim 14, comprising removing oxygen from air by pressure swing absorption.

17. The method of claim 14, comprising removing oxygen from air by a permeable membrane.

18. The method of claim 11, wherein said container is a fuel tank.

19. The method of claim 18, wherein said flammable gas is fuel tank ullage.

20. The method of claim 11, comprising removing oxygen from said flammable gas by membrane separation.

21. The method of claim 11, comprising removing oxygen from said flammable gas by pressure swing absorption.

* * * * *